March 4, 1947.  F. J. LINGEL  2,416,835
ELECTRICAL MEASURING INSTRUMENT
Filed Oct. 6, 1944  2 Sheets-Sheet 1

INVENTOR
FREDERICK J. LINGEL
BY
Toulmin & Toulmin
ATTORNEYS

March 4, 1947.   F. J. LINGEL   2,416,835
ELECTRICAL MEASURING INSTRUMENT
Filed Oct. 6, 1944   2 Sheets-Sheet 2
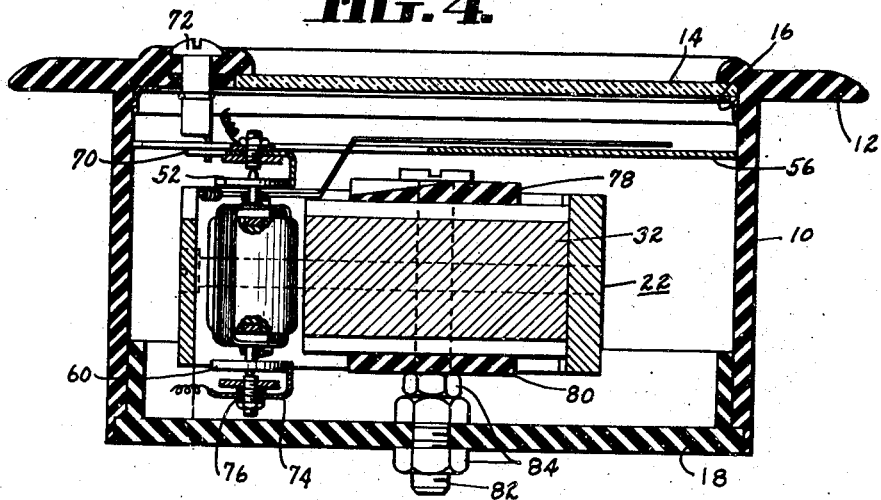
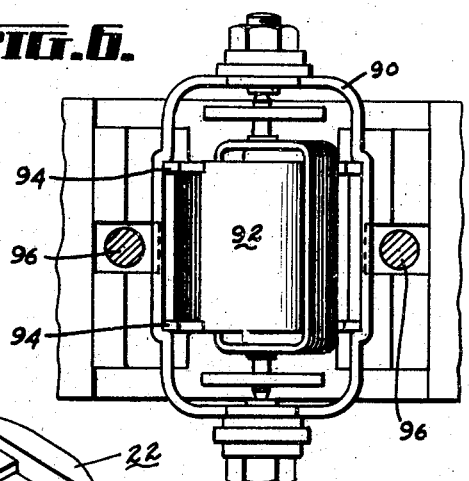
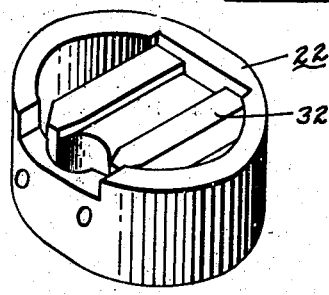
INVENTOR
FREDERICK J. LINGEL
BY
*Toulmin & Toulmin*
ATTORNEYS Patented Mar. 4, 1947

2,416,835

UNITED STATES PATENT OFFICE 2,416,835

ELECTRICAL MEASURING INSTRUMENT

Frederick J. Lingel, Bluffton, Ohio, assignor to The Triplett Electrical Instrument Company, Bluffton, Ohio, a corporation of Ohio Application October 6, 1944, Serial No. 557,493

5 Claims. (Cl. 171—95)

This invention relates to electrical instruments and particularly concerns current responsive devices of the d'Arsonval type.

This invention has for its particular object an improved construction for a d'Arsonval type movement which is more compact than heretofore.

It is another object of this invention to provide a type of construction of the aforementioned type which is more rigidly assembled.

It is another object to provide an instrument in which the number of parts is reduced and fabrication thereof is relatively simple and inexpensive.

It is another object to provide a d'Arsonval type electrical instrument which is inherently self-shielded from stray magnetic fields.

It is another object to provide a type construction for an electrical instrument wherein the moving parts are closely adjacent one side of the meter case so that a longer pointer may be used.

It is another object to provide a d'Arsonval type of measuring instrument which is extremely rigid after assembly thereby insuring freedom from damage due to shock.

It is another object to provide a type of construction in which the magnetic material is in the form of a straight bar in order to secure maximum efficiency especially in the case of some of the newer magnetic materials.

It is another object to provide a type of construction in which one of the pole pieces, the magnetic shield, the magnetic return path and the assembly clamp are in one piece for simplicity of construction.

These and other objects and advantages will become more apparent upon reference to the accompanying drawings, in which:

Figure 4 is a vertical longitudinal section indicated by the line 4—4 on Figure 3;

Figure 5 is a perspective view of the magnet portion of the instrument movement constructed according to this invention; and Figure 6 is a view showing another form of movement frame which is formed of one piece.

General arrangement

The objects of this invention are obtained in the preferred embodiment by providing an annular ring preferably of soft iron and a permanent bar magnet adapted to be received within the ring substantially along the diameter thereof.

The bar magnet abuts the ring on one side thereof and is spaced from the said ring at the other side. The space between the end of the bar magnet and the ring is adapted to receive a d'Arsonval type instrument movement.

The moving coil and core therefor are carried in an integrated structure which is fastened in the space between the ring and the bar magnet by fastening means which also serve to maintain the said magnet and the said ring in rigid relationship.

The assembled unit comprising frame, pole pieces and moving coil is then fastened within a suitable case by blocks of non-magnetic material in such a manner that the moving coil is closely adjacent one side of the said case.

Preferably, the permanent bar magnet is composed of a highly magnetic material such as one of the Alnico alloys. Optionally, the permanent magnet portion of the iron structure may be in a de-magnetized state at the time of assembly and thereafter be magnetized by any suitable means.

The advantages of such a magnet are most fully realized when it is formed in a straight bar and, accordingly, the present invention is well adapted to utilize the modern, magnetic alloys efficiently.

Optionally, the movement frame may be formed of one piece, thus providing for easier assembly and more rigid construction.

Also, optionally, the assembled instrument may be retained in place by the resiliency of the soft annular ring, the assembly being accomplished by pressing the said ring along a diameter at right angles to the axis of the magnet bar until the magnet and movement frame are in place.

Structural arrangement

Figure 1:
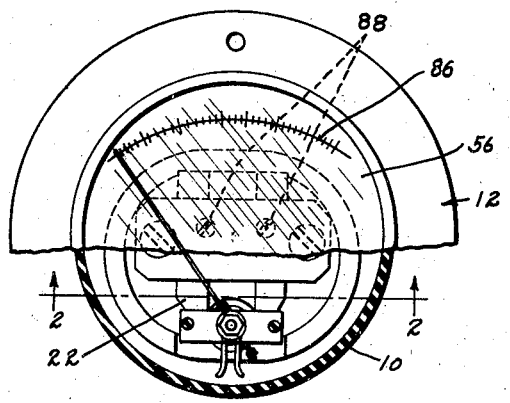
Figure 1 is a plan view partly broken away of an instrument constructed according to this invention.
Figure 2:
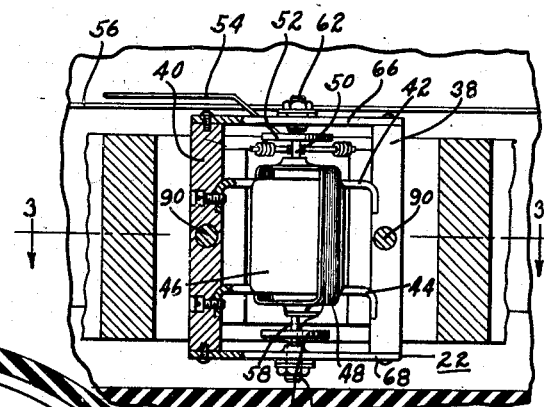
Figure 2 is a vertical section through the device and is indicated by the line 2—2 on Figure 1.
Figure 3:
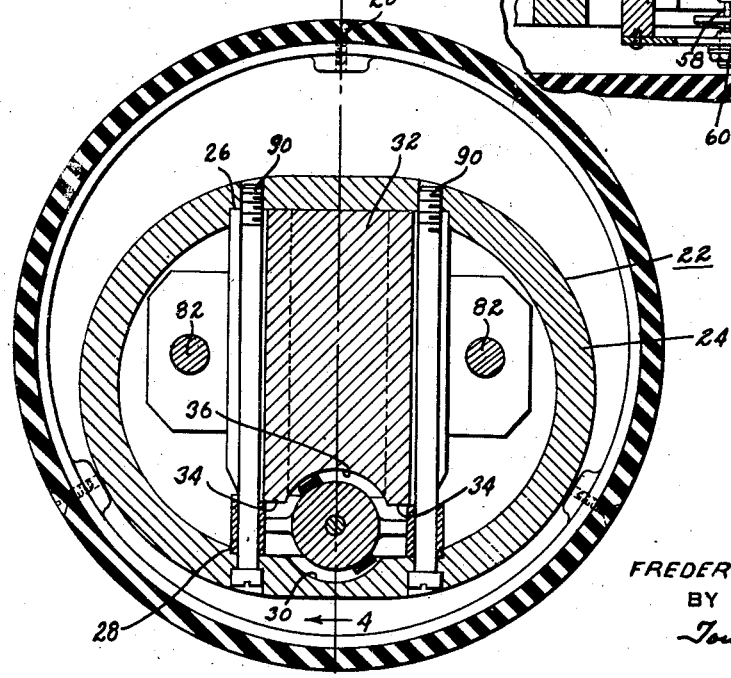
Figure 3 is an enlarged plan section indicated by the line 3—3 on Figure 2.

Referring to the drawings more in detail, the instrument shown in Figure 1 comprises a case 10 which is flanged at its upper edge as at 12 in order to provide for a mounting surface for supporting the instrument in a panel.

The upper end of the case is apertured and a glass 14 is supported therein by the metal ring 16.

The lower end of the case is closed by a cover plate 18 which is retained in place by the screws 20. The case and cover are preferably formed of insulating material.

Mounted within the case 10 is the instrument movement generally indicated at 22. The movement comprises a ring shaped soft iron member 24 which is somewhat larger in the transverse dimension than in the lateral. The member 24 has a notch 26 on one side thereof and a notch 28 on the opposite side thereof, the two notches being of substantially the same dimensions.

The notch 28 is further provided with the arcuate portion 30 for a purpose which will become more apparent hereinafter.

Extending diametrically across the shorter diameter of the member 24 is the permanent magnet 32 which is adapted to be received within the notch 26. The end of the magnet 32 opposite the notch 26 is provided with a surface comprising the flat portions 34 at either side and the arcuate portion 36 in the center. The arcuate portion 36 and the magnet 32 and the arcuate portion 30 in the member 24 define two opposite portions of a cylindrical recess within which the moving coil of the instrument is placed.

The movement proper of the instrument comprises a pair of vertical bars 38 and 40 which are adapted exactly to be received between the surface 34 of the magnet 32 and the notch 28 of the member 24.

Mounted between the bars 38 and 40 by means of the transverse angular strips 42 and 44 is a core piece 46. The core 46 is thereby centrally located in the recess between the magnet 32 and the ring member 24.

Rotatably mounted about the core 46 is a coil 48 comprising a suitable spool member carrying a plurality of turns of relatively fine wire. Attached at the upper end of the coil 48, but insulated therefrom, is a pivot 50 which forms a portion of an assembly which comprises, in addition, a torsion spring 52 and a pointer 54. The pointer 54 sweeps the dial 56 and indicates on suitable indicia the extent of the deflection of the coil 48.

Attached to the lower end of the coil 48, but insulated therefrom, is a pivot shaft 58 which is a portion of an assembly comprising, in addition, the torsion spring 60. The shafts 50 and 58 are journalled, respectively, in the jewelled pivot screws 62 and 64, these latter being carried, respectively, by the bridges 66 and 68 which are attached to the upper and lower ends of the bars 38 and 40.

The springs 52 and 60 have their inner ends attached to the shafts 50 and 58, respectively, and are also, respectively, electrically connected to opposite ends of the coil 48.

Referring to Figure 4, it will be seen that the spring 52 has its outer end attached to an arm 70 which is adjustable by means of the zero adjust screw 72, while the free end of the spring 60 is attached to one end of an arm 74. The arm 74 is insulated from the movement by the insulating sleeve and washer arrangement indicated at 76.

The instrument movement including the ring member 24 and the permanent magnet 32 are retained in the case 10 by means of a pair of strips 78 and 80 which engage the magnet 32 on the upper and lower surfaces thereof. A pair of screws 82 pass through the strips 78 and 80 and through apertures in the cover 18 to the outside of the instrument. The nuts 84 serve to maintain the strips 78 and 80 tightly clamped against the magnet 32 and also to maintain the entire movement assembly in proper location within the case. It will be noted that the moving coil is located closely adjacent the one side of the case thereby permitting the pointer 54 to be made relatively long. The length of the pointer 54 permits the scale 86 to be relatively long and open and thus permits the instrument to be easily and accurately read.

The dial 56 may be attached to the strip 78 by a pair of screws 88 thus providing for a complete assembly which may be placed within any suitable casing means.

The electrical connections to the instrument may be made through the screws 82 with leads being taken from the said screws to the arms 74 and 70, respectively.

If desired, the magnet 32 and the bars 38 and 40 may comprise an assembly slightly longer than the distance between the notches 26 and 28 of the ring member 24. In that case, the assembly of the device is accomplished by exerting pressure along the longer diameter of the said ring member so that the magnet and movement assembly may be snapped into place. It will be evident that under such circumstances the magnet 32, the bars 38 and 40 and the ring member 24 may be provided with suitable interlocking keys so that the screws 90 may be eliminated and the unit retained in its assembled position by the pressure of the ring 24 on the magnet 32 and the movement assembly.

Should it be desired to assemble the instrument before the bar 32 is magnetized, this may be done and the said bar then magnetized by contact with another magnet or by suitable electromagnetic means.

It will also be apparent that the movement is shielded from stray magnetic fields by the ring 24 inasmuch as the latter extends completely around the moving coil and the magnet 32. The effect of this shielding is to permit greater accuracy and to extend the utility of this instrument.

In Figure 6 is illustrated a movement in which the frame 90 is formed of a single annular member. The core 92 is supported in the frame 90 on crossbars 94 which fit within the said frame at opposite offset portions thereof. While the assembly in Figure 6 is shown as retained together by screws 96, it will be understood that the resilience of the iron ring could be employed, as previously mentioned, to maintain the movement-magnet structure assembly together.

While I have shown the preferred embodiment of my invention, it will be understood that the drawings are merely exemplary and that this invention may be advantageously employed in other devices as well as the one shown.

Accordingly, I desire to comprehend such modifications of structure and arrangement and substitution of equivalents as may be considered to come within the scope of the appended claims.

Having thus fully described my invention, what I claim as new and desire to secure by Letters Patent is:

1. A ring, a permanent magnet having ends, one end abutting a side wall of the ring, the other end of said magnet and the opposite side of the wall of the ring having arcuate portions and lateral surfaces on opposite sides of said arcuate portions, at least two frame members, a movement, a means for supporting said movement on said frame members, said frame members each having a pair of surfaces of the same configuration as said lateral surfaces and constructed and adapted to form a close fit with each other whereby to form a uniform air gap between said movement and said arcuate portions.

2. A ring, a permanent magnet having ends, one end abutting a side wall of the ring, the other end of said magnet and the opposite side of the wall of the ring having arcuate portions and lateral surfaces on opposite sides of said arcuate portions, at least two frame members, a movement, and means for supporting said movement on said frame members, said means including bridges connecting the opposite ends of said frame members, said frame members each having a pair of surfaces of the same configuration as said lateral surfaces and constructed and adapted to form a close fit with each other whereby to form a uniform air gap between said movement and said arcuate portions.

3. A ring, a permanent magnet having ends, one end abutting a side wall of the ring, the other end of said magnet and the opposite side of the wall of the ring having arcuate portions and lateral surfaces on opposite sides of said arcuate portions, at least two frame members, a movement, and means for supporting said movement on said frame members, said frame members each having a pair of flat surfaces and said lateral surfaces being flat whereby said frame member surfaces and said lateral surfaces are adapted to form a close fit with each other to thereby form a uniform air gap between said movement and said arcuate portions.

4. A ring, a permanent magnet having ends, one end abutting a side wall of the ring, the other end of said magnet and the opposite side of the wall of the ring having arcuate portions and lateral surfaces on opposite sides of said arcuate portions, at least two frame members, a movement, and means for supporting said movement on said frame members, said means including bridges connecting the opposite ends of said frame members, said frame members each having a pair of flat surfaces and said lateral surfaces being flat whereby said frame member surfaces and said lateral surfaces are adapted to form a close fit with each other to thereby form a uniform air gap between said movement and said arcuate portions.

5. A ring, a permanent magnet having ends, one end abutting a side wall of the ring, the other end of said magnet and the opposite side of the wall of the ring having arcuate portions and lateral surfaces on opposite sides of said arcuate portions, at least two frame members, a movement, a means for supporting said movement on said frame members, said frame members each having a pair of surfaces of the same configuration as said lateral surfaces and constructed and adapted to form a close fit with each other whereby to form a uniform air gap between said movement and said arcuate portions, and a plurality of fastening members, each of said members having its ends mounted in said ring, each member having an elongated shank, said shank extending through one of said frame members and lying adjacent to one side of said permanent magnet.

FREDERICK J. LINGEL.

REFERENCES CITED

The following references are of record in the file of this patent:

UNITED STATES PATENTS

| Number | Name | Date |
| --- | --- | --- |
| 392,387 | Weston | Nov. 6, 1888 |
| 735,168 | Stevens | Aug. 4, 1903 |
| 994,923 | Holmes | June 13, 1911 |
| 1,985,082 | Faus | Dec. 18, 1934 |